Nov. 16, 1937.   J. W. MacCLATCHIE   2,099,169
SEALING MEANS
Original Filed Aug. 8, 1934    2 Sheets-Sheet 2
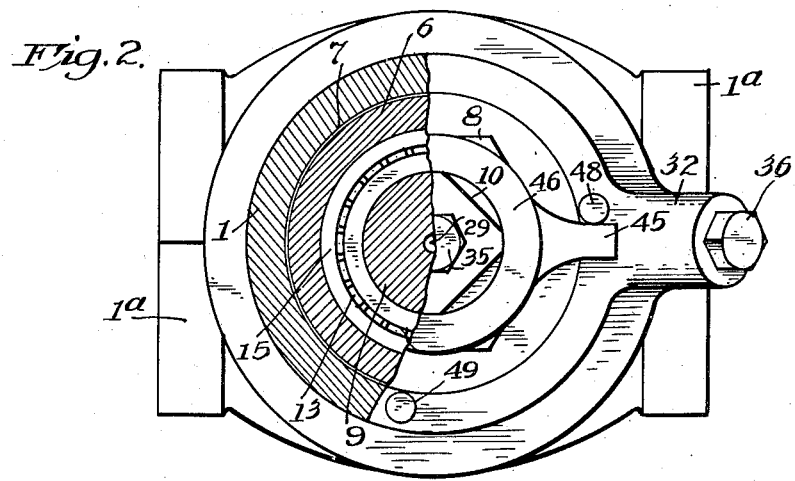
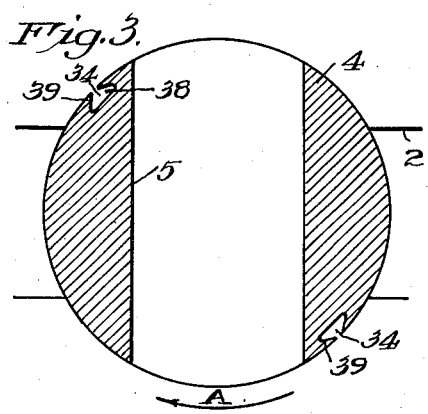
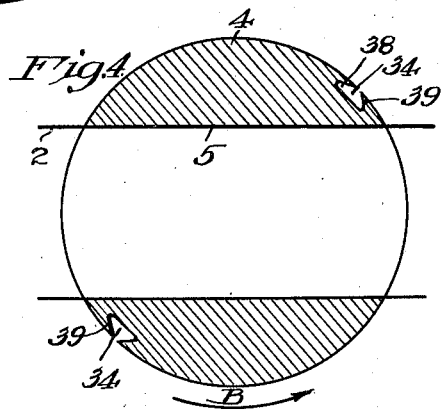
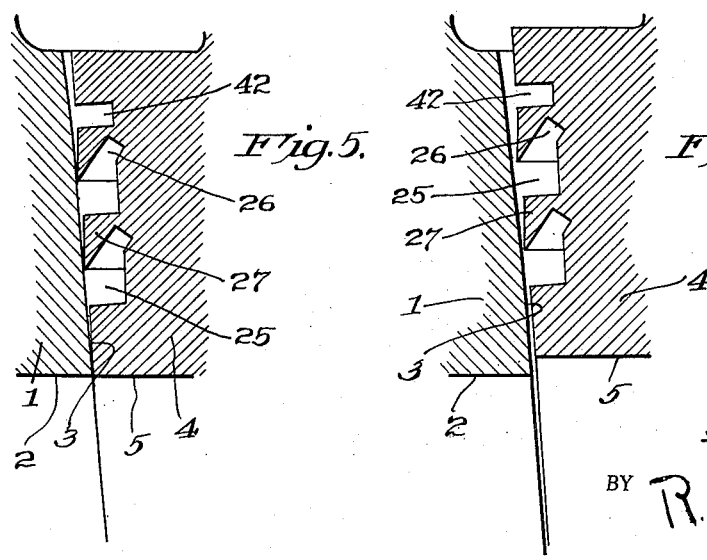
INVENTOR
John W. MacClatchie
BY R. W. Smith
ATTORNEY.

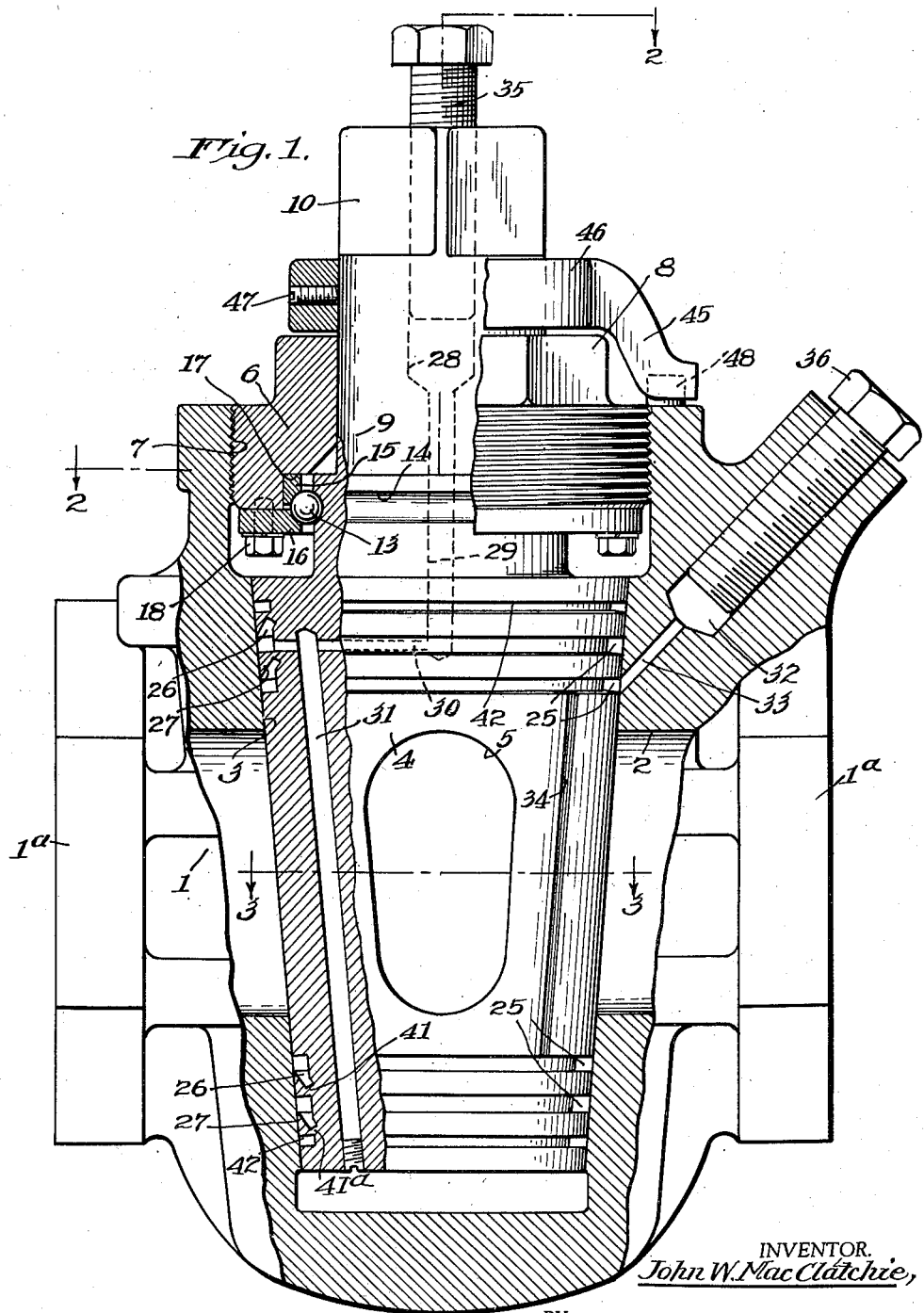

Patented Nov. 16, 1937

2,099,169

UNITED STATES PATENT OFFICE 2,099,169

SEALING MEANS

John W. MacClatchie, Los Angeles, Calif., assignor to MacClatchie Manufacturing Company of California, Compton, Calif., a corporation of California Original application August 8, 1934, Serial No. 738,975. Divided and this application April 26, 1935, Serial No. 18,280

17 Claims. (Cl. 251—93)

This invention is a sealing means, the present application being a continuation in part of my copending application Ser. No. 725,527 filed May 7, 1934, and also being a division of my copending application Ser. No. 738,975 filed August 8, 1934.

The invention provides for sealing a seating or bearing surface, and for purpose of illustration is hereinafter particularly described with reference to a plug valve for sealing off between the plug and its cooperating seat.

It is an object of the invention to seal the seating surface both longitudinally and circumferentially, even though the fluid which is to be sealed off is at relatively high pressure.

It is a further object of the invention to seal the plug along its length only in the event that a tight seal is being maintained circumferentially of the plug, so that any leakage longitudinally of the plug which may be readily observed by the operator, will indicate that the plug is not maintaining a tight closure around the plug, in other words that the fluid which is to be controlled is leaking past the plug; while on the other hand, as long as the operator observes that there is no leakage longitudinally of the plug he is assured that fluid is not leaking around the plug, thereby giving him definite information as to the operation of the valve which otherwise would not be available when the valve is operatively connected to a pipe line.

It is a still further object of the invention to provide the desired seal by an extremely simple and inexpensive construction which is adapted for rapid and convenient manufacture.

It is a still further object of the invention to provide a sealing engagement whereby friction is reduced to a minimum, so that the valve plug may be readily turned to either open or closed position.

It is a still further object of the invention to seal and also lubricate the seating surface, and prevent escape of lubricant into the flow line in which the valve is placed.

More particularly it is an object of the invention to seal the valve plug by means of an expansible sealing lip and if desired to provide such lips both circumferentially and longitudinally of the seating surface of the valve, with the lip adapted for expansion by fluid pressure other than merely the pressure of the flow which the valve is intended to shut off, and with the lip formed by a groove in either the bearing surface of the plug or the cooperating bore of the valve casing whereby the lip is an integral part of either the plug or the valve casing; and with the fluid pressure furnished by a lubricant which is supplied to the groove, and the seating surface lubricated by the lubricant in the groove.

It is a further object of the invention to provide lipped grooves extending both circumferentially and longitudinally of the bearing surface of a plug valve, but so arranged that the plug may be turned to open or closed position without at any time exposing the grooves to the flow passageway in the valve casing in which the plug is mounted.

It is a still further object of the invention to conveniently distribute lubricant under pressure to various grooves which provide a plurality of sealing lips at the bearing surface, and preferably to provide a dual lubricant supply system, with one lubricant reservoir preferably provided in the valve plug and another lubricant reservoir formed in the valve casing which receives the plug.

Further objects of the invention will be readily understood from the following description of the accompanying drawings, in which:

Fig. 1 is a side elevation of a plug valve embodying the invention, partly in axial section.

Fig. 2 is a transverse section on the line 2—2 of Fig. 1.

Fig. 3 and 4 are transverse sections on the line 3—3 of Fig. 1, showing the valve plug turned to closed and open positions respectively.

Figs. 5 and 6 are diagrammatic sections through the seating surface showing the operation of the sealing means.

The invention is illustrated embodied in a plug valve comprising a casing 1 having fluid passageway 2 and transverse tapering metal bore 3, with a tapering valve plug 4 rotatable in bore 3 and having a transverse port 5 adapted for alinement or non-alinement with passageway 2 by a quarter-turn of the plug, so as to close or open the valve as shown at Figs. 3 and 4 respectively. The peripheral surfaces of plug 4 and bore 3 cooperate to define a bearing surface which provides a seating surface for the valve plug.

The valve plug may be releasably held in bore 3 and longitudinally adjusted relative thereto by means such as illustrated and claimed in my copending application Ser. No. 738,975, filed August 8, 1934. This retaining and adjusting means includes a cap 6 which is screwed into a threaded end 7 of the transverse bore 3 and which has a head 8 adapted for engagement by a suitable wrench, the opposite end of bore 3 being preferably closed by an integral part of casing 1.

The plug 4 has a stem 9 preferably integral with the plug, and projecting through the closure cap 6 and rotatable therein and having a head 10 at its outer end adapted for engagement by a suitable wrench.

A series of anti-frictional bearings 13 are arranged circumferentially between the stem 9 and the cap 6 and are shown journaled in an annular groove 14 in the stem, with bearing rings 15—16 engaging the projecting portions of the bearings at opposite sides thereof longitudinally of bore 3, and with the bearing rings fixed relative to cap 6. As an instance of this arrangement the cap 6 is shouldered as shown at 17 to form an abutment for the bearing ring 15, and the bearing ring 16 is secured to the end of cap 6 by means of cap screws 18.

The bearings 13 thus provide an anti-frictional bearing for the rotatable valve plug, with the bearing ring 15 adapted to positively tighten the plug in its cooperating tapering bore when the cap 6 is screwed down, and with the bearing ring 16 positively withdrawing the plug from its cooperating seat when the cap 6 is unscrewed.

An expansible seal is provided at the seating surface between plug 4 and bore 3, and in the present embodiment is shown as a part of the bearing surface of the valve plug rather than a part of the cooperating bearing surface of the bore. The expansible seal is formed by a metal lip, which in the illustrated embodiment of the invention is provided by means of an annular groove in the bearing surface of the metal plug having one of its sidewalls undercut so as to form a tapering lip at the bearing surface of the plug and integral with the plug.

Expansible seals as thus described are provided adjacent the ends of the plug at opposite sides of the transverse port 5, and in practice a plurality of the grooves, shown at 25, are preferably provided adjacent each end of the plug, with the wall of each groove which is remote from the transverse port 5 undercut as shown at 26 so as to form a tapering lip 27 at the bearing surface of the plug and at the side of the groove 25 which is remote from the transverse port 5.

Pressure is maintained against the lips 27 for expanding them for sealing engagement with the bearing surface of bore 3; and if the medial portion of the valve plug does not tightly seal off around the passageway 2, pressure from said passageway may seep along the seating surface so as to exert pressure against the lips tending to expand the same, but the invention provides for directing such pressure against the lips as will assure their expansion, other than merely relying upon pressure of the fluid which may leak along the seating surface from the passageway 2. For this purpose a fluid under pressure and which is a fluid separate and distinct from the fluid flowing through passageway 2, may be supplied to grooves 25, the fluid being preferably a lubricant which will lubricate the seating surface between the plug 4 and its cooperating bore 3.

To insure an adequate supply and uniform distribution of the lubricant when a plurality of the grooves 25 are provided adjacent each end of the plug, one lubricant reservoir preferably supplies one pair of grooves at opposite sides of transverse port 5, while a second reservoir supplies a second pair of grooves at opposite sides of the transverse port.

The pair of grooves 25 which are remote from port 5 may be supplied from a reservoir 28 in the valve stem 9, the reservoir having a duct 29 leading therefrom and communicating via a transverse duct 30 with a longitudinal duct 31 which in turn opens into the said pair of grooves. The pair of grooves which are proximate to the port 5 may be supplied from a reservoir 32, which is formed in the valve casing 1 and which communicates via duct 33 with one of the said pair of grooves, and lubricant is supplied thence to the other of said pair of grooves via grooves 34 which are formed in the bearing surface of the valve plug for a purpose hereinafter described. Pressure screws 35—36 are threaded into reservoirs 28—32 for exerting pressure on the lubricant and forcing it into the grooves 25 and against the lips 27.

The lips 27 are thus adapted for expansion by pressure of the lubricant so as to seal off the valve plug longitudinally thereof; and means are also provided for sealing off circumferentially of the plug. For this purpose the longitudinal grooves 34 are undercut as shown at 38 so as to form lips 39 which are adapted for expansion by pressure of the lubricant in the grooves. The lips 39 are preferably formed at each side of grooves 34 so as to seal off circumferentially of the valve, irrespective of the direction of flow through the passageway 2.

The lips 27 and 39 being metal lips, preferably integral with the metal plug 4, are comparatively rigid although inherently slightly flexible, and to insure desired flexing responsive to fluid pressure may be weakened adjacent their bases as illustrated in connection with lips 27. As an instance of this arrangement the pair of grooves 25 which are proximate to the port 5 may be positioned so closely adjacent the pair of grooves which are remote from port 5, that the bases of the lips 27 of said proximate pair of grooves are of appreciable restricted width as shown at 41; and in order to similarly weaken the bases of the lips of the pair of grooves 25 which are remote from port 5, annular grooves 42 may be formed in the bearing surface of plug 4 in back of said remote pair of grooves in the direction of the length of the plug, so as to restrict the width of the bases of their lips as shown at 41a.

When the lips 27 and 39 are flexed by pressure of the lubricant supplied to the grooves, the extreme feather edges of the lips engage the bearing surface of bore 3 and thus seal off the valve both longitudinally and circumferentially, but with minimum area of sealing contact due to the feather edge engagement, so as to eliminate excessive friction. At the same time the lubricant in the open grooves is supplied to the bearing surface of bore 3 for lubricating the rotatable valve plug. The plug 4 is seated in the bore 3 so as to just permit turning of the plug and allow a film of the lubricant being forced from the open grooves 25—34 and between the bearing surfaces of the plug and the cooperating bore. Considerable pressure must be exerted against the lubricant to force it between these cooperating bearing surfaces, and the pressure which is exerted for this purpose is sufficient to flex the lips 27 and 39 due to their inherent slight flexibility, so that their feather edges seal the cooperating bearing surfaces, but due to the lips being metal lips so that they have only such slight inherent flexibility as to maintain them almost completely rigid, the pressure which is employed and which is just such as will spread out the film of lubricant between the cooperating bearing surfaces, is not sufficient to so flex the lips 27 and 39 as to contact more than their extreme feather edges with the cooperating bearing surface, thereby preventing such distortion of the lips as would effect such a tight binding engagement as to prevent rotation of the valve plug.

The lubricant which is thus supplied to the bearing surface of bore 3 is trapped between the valve plug and its cooperating bore against free discharge into the passageway 2 of the valve casing, irrespective of whether the plug 4 is turned to open or closed position; and for this purpose the grooves 25 are beyond opposite sides of passageway 2 longitudinally of the valve plug, so that these grooves are never exposed to the passageway; and the grooves 34 are so positioned that irrespective of turning of plug 4 they are never exposed to the fluid passageway. As an instance of this arrangement rotation of the valve plug is limited to a quarter turn, as for example by an arm 45 projecting from a collar 46 which is fixed on valve stem 9 by a set screw 47, with the arm adapted for limited oscillation between stops 48—49 on the valve casing; and the grooves 34 are positioned one adjacent each end of port 4 but at opposite sides of the port 4 as shown at Figs. 3 and 4. Each groove is adjacent that side of the proximate end of the transverse port which is the trailing side of said end of the port when the plug makes a quarter turn from closed to open position as indicated by the arrow A at Fig. 3; and therefore during turning of the valve plug to open or closed position as indicated by arrows A and B at Figs. 3 and 4, the grooves 34 remain alined with the solid surface of bore 3, without ever alining with that portion of said bearing surface which communicates with passageway 2, and consequently the lubricant in these grooves is never free to escape into the fluid passageway of the valve casing.

Positioning of the lipped grooves 34 as just described insures a circumferential seal when the valve plug is turned to closed position since one of the lipped grooves is adjacent one side of one end of passageway 2 while the other lipped groove is adjacent the opposite side of the other end of the flow passageway as shown at Fig. 3, thereby completely sealing off around the valve plug.

Since the comparatively rigid lips 27—39 are adapted for only limited expansion even when high pressure such as is necessary to force a film of lubricant between the cooperating bearing surfaces, is applied by screwing down the pressure screws 35—36, the valve plug must be longitudinally adjusted in bore 3 until it is just free to turn, in order that the limited expansion of which the sealing lips are capable may be sufficient to provide a tight seal both circumferentially and longitudinally of the valve plug. But if the valve plug is improperly adjusted so that the maximum expansion of the lips which may be obtained by the pressure of the lubricant is insufficient to provide a tight seal, leakage will occur at the lips 27 before there is leakage around the valve plug and past the lips 39. This is due to the fact that the portion of the valve casing medially of the length of bore 3 is braced by the projecting nipples 1a of the valve casing while the ends of bore 3 are not similarly braced, and consequently high pressure through the valve may radially expand the ends of bore 3 but will not similarly distort the medial braced portion of the bore, this differential radial expansion of the bore 3 being shown, greatly exaggerated, at Figs. 5 and 6.

It will thus be seen that greater expansion of lips 27 than of lips 39 is necessary to insure a tight sealing engagement, and consequently if the plug is improperly longitudinally adjusted relative to its bore so that the radial spacing between the plug 4 and the bearing surface of bore 3 is such that the limited expansion of which lips 39 are capable is insufficient to engage the lips 39 with the bearing surface of bore 3 for preventing invisible leakage around the valve plug, there will also be longitudinal leakage past the lips 27 as shown at Fig. 6, due to the greater radial spacing between the plug 4 and the bore 3 at the ends of said bore. This leakage will escape at the threaded connection 7 so as to visibly indicate that the valve plug is not properly adjusted to its seat.

The operator is thus warned to screw down on cap 6 to longitudinally adjust the tapering valve plug relative to its seat for restricting the radial spacing between the plug and its bore until the leakage past the screw connection 7 is stopped, which will indicate that lips 27 are making a tight sealing engagement as shown at Fig. 5. This will indicate that the lips 39 are also making a tight seal, since the radial spacing between plug 4 and bore 3 at the ends of the bore is greater than that at the medial portion of the bore as previously described, and consequently if the adjustment is such that the lips 27 are capable of sealing off this greater radial spacing at the ends of the bore, the lips 39 will also seal off the lesser radial spacing at the medial portion of the bore.

The invention thus provides for completely sealing off a bearing surface such as the seating surface of a plug valve, both circumferentially and longitudinally thereof, with the sealing means comprising comparatively rigid lips which are adapted for limited expansion by fluid pressure, and with a lubricant supplying the fluid pressure and adapted to lubricate the bearing surface but trapped against escape into the flow passageway of the valve, and with the absence of leakage along the length of the valve plug indicating that the valve is properly functioning to tightly close the passageway 2. The invention also provides for maintaining such pressure on the lubricant as will force it between the cooperating bearing surfaces of the plug and the valve casing, with the slightly flexible lips adapted for expansion by said pressure so as to provide a seal, but with the comparatively rigid lips incapable of such expansion as to produce excessive friction, even when subjected to the relatively high pressure required to force a film of lubricant between the cooperating bearing surfaces.

While the invention has been particularly described with reference to a plug valve, it will be noted that the expansible lip sealing engagement is applicable to any structure wherein fluid is to be sealed off at the seating or bearing surface between cooperating elements, as defined within the scope of the following claims.

I claim:

1. In a plug valve, a valve casing having a fluid passageway and a bore for a valve plug intersecting the passageway, a valve plug rotatable in the bore and having a transverse port adapted for alinement or non-alinement with the passageway, the plug and bore cooperating to define a seating surface, a comparatively rigid but inherently slightly flexible lip at the seating surface remote from the passageway, and means for exerting pressure against the lip for expanding the same, the lip being of such inherent rigidity that its maximum pressure responsive expansion is greater than the radial spacing between the plug and its bore remote from the passageway, when the radial spacing adjacent the passageway is so limited that the plug is adapted to seal off around said passageway, and is less than the radial spacing remote from the passageway, when the radial spacing adjacent the passageway is such as to permit leakage around the plug.

2. In a plug valve, a valve casing having a tapered bore, a tapering valve plug rotatable in said tapering bore, the plug and bore cooperating to define a tapering seating surface, means for longitudinally adjusting and non-yieldingly retaining the tapering plug in longitudinally adjusted position in the tapering bore, the plug and casing being cooperating metal elements having a groove in at least one of said cooperating elements at said seating surface, a side wall of the groove being undercut to form a metal lip integral with said one of the cooperating elements, the groove being open to the seating surface along the opposite side wall of the groove, a reservoir in the plug for supplying a lubricant to the groove and against the back of the lip, means in the reservoir for maintaining the lubricant under pressure, and means for adjusting the pressure so as to force the lubricant from the groove and between said cooperating elements and along the seating surface in a direction away from the lipped side of the groove, the lip having such inherently slight flexibility increasing toward its free edge as to adapt it for only such limited expansion responsive to said pressure as will seal the lip against the other of said cooperating elements at only the free edge of the lip without appreciably frictionally binding the cooperating elements against relative movement.

3. In a plug valve, a valve casing, a valve plug rotatable in the casing, the plug and casing being metal elements cooperating to define a seating surface, a groove in at least one of said cooperating elements at said seating surface, a side wall of the groove being undercut to form a metal lip integral with said one of the cooperating elements, the groove being open to the seating surface along the opposite side wall of the groove, the grooved one of the cooperating elements having a recess therein in back of the lip providing a restricted base for the lip insuring slight flexibility of the lip, a reservoir in the plug for supplying a lubricant to the groove and against the back of the lip, means in the reservoir for maintaining the lubricant under pressure, and means for adjusting the pressure so as to force the lubricant from the groove and the said cooperating elements and along the seating surface in a direction away from the lipped side of the groove, the lip having such inherently slight flexibility increasing toward its free edge as to adapt it for only such limited expansion responsive to said pressure as will seal the lip against the other of said cooperating elements at only the free edge of the lip without appreciably frictionally binding the cooperating elements against relative movement.

4. In combination, a valve casing having a flow passageway, a valve in the casing controlling the flow through the passageway, the valve and casing cooperating to define a seating surface, a comparatively rigid but inherently slightly flexible lip at the seating surface and remote from the passageway, and means for exerting pressure against the lip for expanding the same, the lip being of such inherent rigidity that its maximum pressure responsive expansion is greater than the spacing between the valve and the casing at the seating surface and remote from the passageway, when the spacing at the seating surface and adjacent the passageway is so limited as to seal around the valve, and is less than the spacing at the seating surface and remote from the passageway, when the spacing at the seating surface and adjacent the passageway is such as to permit leakage around the valve.

5. In a plug valve, a valve casing having a tapering bore, a tapering valve plug rotatable in said tapering bore, the plug and bore cooperating to define a tapering seating surface, means for longitudinally adjusting and non-yieldingly retaining the tapering plug in longitudinally adjusted position in the tapering bore, the plug and casing being cooperating elements having a groove in at least one of said cooperating elements at said seating surface, a metal lip at a side wall of the groove, the groove being open to the seating surface along the opposite side wall of the groove, means for supplying a lubricant to the groove and against the back of the lip irrespective of longitudinal adjustment of the valve plug in the tapering bore, and means for maintaining the lubricant under such pressure as to force the lubricant from the groove and between the said cooperating elements and along the seating surface in a direction away from the lipped side of the groove, the lip having such inherently slight flexibility as to adapt it for only such limited expansion responsive to said pressure as will seal the lip against the other of said cooperating elements without appreciably frictionally binding the cooperating elements against relative movement.

6. In combination, a valve casing, a valve movable in the casing, said casing and valve being metal elements which cooperate to define a seating surface, a groove in at least one of said cooperating elements at said seating surface, a metal lip integral with the grooved element at a side wall of the groove, the groove being open to the seating surface along the opposite side wall of the groove, means for supplying a lubricant to the groove and against the back of the lip, means for maintaining the lubricant under pressure, and means for adjusting the pressure so as to force the lubricant from the groove and between the said cooperating elements and along the seating surface in a direction away from the lipped side of the groove, the lip having such inherently slight flexibility increasing toward its free edge as to adapt it for only such limited expansion responsive to said pressure as will seal the lip against the other of said cooperating elements at only the free edge of the lip without appreciably frictionally binding the cooperating elements against relative movement.

7. In a plug valve, a valve casing, a valve plug rotatable in the casing, the plug and casing being metal elements cooperating to define a seating surface, a groove in at least one of said cooperating elements at said seating surface, a side wall of the groove being undercut to form a metal lip integral with said one of the cooperating elements, the groove being open to the seating surface along the opposite side wall of the groove, means for supplying a lubricant to the groove and against the back of the lip, and means for maintaining the lubricant under such pressure as to force the lubricant from the groove and between the said cooperating elements and along the seating surface in a direction away from the lipped side of the groove, the lip having such inherently slight flexibility increasing toward its free edge as to adapt it for only such limited expansion responsive to said pressure as will seal the lip against the other of said cooperating elements at only the free edge of the lip without appreciably frictionally binding the cooperating elements against relative movement.

8. In a plug valve, a valve casing, a valve plug rotatable in the casing, the plug and casing being metal elements cooperating to define a seating surface, a groove in at least one of said cooperating elements at said seating surface, a side wall of the groove being undercut to form a metal lip integral with said one of the cooperating elements, the groove being open to the seating surface along the opposite side wall of the groove, means for supplying a lubricant to the groove and against the back of the lip, and means for maintaining the lubricant under such pressure as to force the lubricant from the groove and between the said cooperating elements and along the seating surface in a direction away from the lipped side of the groove, the lip having such inherently slight flexibility as to adapt it for only such limited expansion responsive to said pressure as will seal the lip against the other of said cooperating elements without appreciably frictionally binding the cooperating elements against relative movement.

9. In combination, a valve casing, a valve movable in the casing, said casing and valve being elements which cooperate to define a seating surface, a groove in at least one of said cooperating elements at said seating surface, a metal lip at a side wall of the groove, the groove being open to the seating surface along the opposite side wall of the groove, means for supplying a lubricant to the groove and against the back of the lip, and means for maintaining the lubricant under such pressure as to force the lubricant from the groove and between the said cooperating elements and along the seating surface in a direction away from the lipped side of the groove, the lip having such inherently slight flexibility increasing toward its free edge as to adapt it for only such limited expansion responsive to said pressure as will seal the lip against the other of said cooperating elements at only the free edge of the lip without appreciably frictionally binding the cooperating elements against relative movement.

10. In combination, relatively movable cooperating elements which define a seating surface between said elements, a groove in at least one of said cooperating elements at said seating surface, a metal lip at a side wall of the groove, the groove being open to the seating surface along the opposite side wall of the groove, means for supplying a lubricant to the groove and against the back of the lip, and means for maintaining the lubricant under such pressure as to force the lubricant from the groove and between the cooperating elements and along the seating surface in a direction away from the lipped side of the groove, the lip having such inherently slight flexibility increasing toward its free edge as to adapt it for only such limited expansion responsive to said pressure as will seal the lip against the other of said cooperating elements at only the free edge of the lip without appreciably frictionally binding the cooperating elements against relative movement.

11. In a plug valve, a valve casing, a valve plug rotatable in the casing, the plug and casing being metal elements cooperating to define a seating surface, a groove in at least one of said cooperating elements at said seating surface, a side wall of the groove being undercut to form a metal lip integral with said one of the cooperating elements, the groove being open to the seating surface along the opposite side wall of the groove, and means for maintaining pressure in the groove and against the back of the lip, the lip having such inherently slight flexibility as to adapt it for limited expansion responsive to said pressure for sealing the lip against the other of said cooperating elements.

12. A metal valve plug adapted for rotatable mounting in a valve casing for cooperation therewith to define a seating surface, a groove in the metal valve plug at said seating surface, a side wall of the groove being undercut to form a metal lip integral with the valve plug, the groove being open to the seating surface along the opposite side wall of the groove, a lubricant reservoir in the valve plug communicating with the groove and the back of the lip, means for exerting pressure in the reservoir, and means for adjusting the pressure for forcing the lubricant against the back of the lip and from the groove and along the seating surface, the lip having such inherently slight flexibility increasing toward its free edge as to adapt it for limited expansion responsive to such pressure for sealing the lip against the valve casing at only the free edge of the lip.

13. A valve plug adapted for rotatable mounting in a valve casing for cooperation therewith to define a seating surface, a groove in the valve plug at said seating surface, a metal lip at a side wall of the groove, the groove being open to the seating surface along the opposite side wall of the groove, and means in the valve plug for exerting pressure against the back of the lip and at the open side wall of the groove, the lip having such inherently slight flexibility as to adapt it for limited expansion responsive to such pressure for sealing the lip against the valve casing.

14. In a plug valve adapted for insertion in a fluid pressure line, a valve casing having a passageway therethrough for fluid under pressure and a bore for a plug valve intersecting the passageway, a valve plug rotatable in the bore and having a transverse port adapted for alinement or non-alinement with the passageway, the plug and bore providing elements which cooperate to define a seating surface, a groove in at least one of said cooperating elements at said seating surface and intermediate said passageway and an end of the bore, a metal lip at the side wall of the groove remote from the passageway, the groove being open to the seating surface along the opposite side wall of the groove, means for supplying a lubricant to the groove so that the lubricant is forced against the back of the lip, and means for maintaining the lubricant under such pressure as to force the lubricant from the groove and between the cooperating elements along the seating surface in a direction to oppose outward passage of pressure fluid from the passageway between the valve plug and the bore, and the lip having such inherently slight flexibility as to adapt it for only such limited expansion responsive to such lubricant pressure as will seal the lip against the other of said cooperating elements at substantially only the free edge of the lip.

15. In a plug valve adapted for insertion in a fluid pressure line, a valve casing having a pressure fluid passageway therethrough and a bore for a plug valve intersecting the passageway, a valve plug rotatable in the bore and having a transverse fluid port therethrough adapted for alinement or non-alinement with the pressure fluid passageway, the plug and bore providing elements which cooperate to define a seating surface, a groove in at least one of said cooperating elements at said seating surface intermediate said passageway and one end of the bore and a similar groove in at least one of said cooperating elements at the seating surface intermediate the passageway and the opposite end of the bore, each of said grooves having a metal lip at the side wall of the groove remote from the passageway, each groove being open to the seating surface along the side wall of the groove opposite the lip, means for supplying a lubricant to the said grooves so that lubricant may be forced under pressure against the backs of the said lips, and means for maintaining the lubricant under such pressure as to slightly flex the lip of each groove outwardly to maintain only the lip free edge in sealing engagement with the other of said cooperating elements, the lubricant under such pressure being forced from the said grooves and between the cooperating elements along the seating surface at opposite sides of the passageway respectively, and in directions to oppose passage of pressure fluid outwardly from the passageway between the valve plug and the bore toward the opposite ends thereof.

16. In a plug valve adapted for insertion in a fluid pressure line, a valve casing having a passageway therethrough for fluid under pressure and a bore for a plug valve intersecting the passageway, a valve rotatable in the bore and having a transverse port therethrough adapted for alinement or non-alinement with the passageway, the plug and bore providing elements which cooperate to define a seating surface, a groove in at least one of said cooperating elements at said seating surface and intermediate said passageway and one end of the bore and a similar groove in at least one of said cooperating elements at said seating surface and intermediate said passageway and the opposite end of the bore, each of said grooves having a lip at the side of the groove that is remote from the passageway, each groove being open to the seating surface along the side wall of the groove opposite said lip, diametrically opposite grooves in at least one of said cooperating elements at the seating surface between said first mentioned grooves and intermediate the ends of the transverse port in said valve plug, said latter grooves being disposed longitudinally of the bore and each having a lip along opposite sides thereof with the groove open to the seating surface between said lips, means for supplying a lubricant to the grooves and against the backs of the said lips, and means for maintaining the lubricant under pressure of such a magnitude as to slightly flex the lips of the grooves and force only the free edges of the lips into sealing engagement with the seating surfaces and also force the lubricant from the grooves between the cooperating elements along the seating surfaces in directions toward the passageway but opposing outward passage of pressure fluid from the passageway between the valve plug and the bore.

17. In a plug valve adapted for insertion in a fluid pressure line, a valve casing having a pressure fluid passageway therethrough and a tapering bore for a plug valve intersecting the passageway, a valve plug rotatable in said tapering bore and having a transverse port therethrough adapted for alinement or non-alinement with the passageway, the plug and bore cooperating to define a tapering seating surface, means for longitudinally adjusting and non-yieldingly retaining the tapering plug in longitudinally adjusted position in the tapering bore, a groove in at least one of said cooperating elements at said seating surface and intermediate said passageway and an end of the bore, a metal lip at the side wall of the groove remote from the passageway, the groove being open to the seating surface along the opposite side wall of the groove, means for supplying a lubricant to the groove and against the back of the lip, and means for maintaining the lubricant under a pressure of such a magnitude as to flex the lip outwardly and also expel lubricant from the groove and between the cooperating elements along the seating surface, the said lip having such inherently slight flexibility as to adapt it for only such limited expansion responsive to the aforesaid lubricant pressure as will seal the lip against the other of said cooperating elements at only the free edge of the lip without appreciably frictionally binding the valve plug against rotation.

JOHN W. MacCLATCHIE.